Patented Aug. 23, 1949

2,479,618

UNITED STATES PATENT OFFICE 2,479,618

LOW-TEMPERATURE FRIEDEL-CRAFTS POLYMERIZATION OF ALPHA ALKYL STYRENES IN CARBON DISULFIDE SOLUTION

Arthur B. Hersberger, Drexel Hill, and Randall G. Heiligmann, Yeadon, Pa., assignors to The Atlantic Refining Company, Philadelphia, Pa., a corporation of Pennsylvania No Drawing. Application July 29, 1944, Serial No. 547,286

6 Claims. (Cl. 260—93.5)

The present invention relates to the polymerization of unsaturated compounds to form useful resinous materials, and relates more particularly to the polymerization of an alpha alkyl styrene, mixtures of alpha alkyl styrenes, or polymerizable mixtures containing substantial quantities of an alpha alkyl styrene.

An object of this invention is the production of resinous materials by the polymerization of alpha alkyl styrenes in the presence of an active Friedel-Crafts type catalyst and a diluent comprising carbon disulfide, at a temperature below 10° C. and preferably between —50° C. and the freezing point of diluted reactants.

It has been proposed heretofore to effect polymerization of alpha alkyl styrene and its homologues in the presence of a Friedel-Crafts type catalyst and a diluent such as petroleum naphtha or halogenated hydrocarbons, i. e., the lower alkyl chlorides such as ethyl chloride and the like. While it was possible to produce substantially solid resins at relatively low temperatures by this method, it was found that the alkyl chloride had a tendency to inhibit extended polymerization either by causing stoppage of the chain reaction or by entering such reaction and becoming a part of the polymer molecule. Regardless of the exact cause, the use of the alkyl halide as a diluent resulted in the formation of polymers having a molecular weight only about 50% as high as that of polymers produced in the presence of carbon disulfide at temperatures at which carbon disulfide may be effectively employed.

We have found that this difficulty may be overcome by the use of carbon disulfide as a solvent or diluent for the alpha alkyl styrene or mixtures containing an alpha alkyl styrene, and likewise as a solvent for the Friedel-Crafts type catalyst. While it is preferred to use carbon disulfide both as a diluent for the alpha alkyl styrene and as a solvent for the catalyst, we have found that the catalyst may be employed in solution in other solvents, such as alkyl halides, without detriment to the polymerization reaction, provided the alpha alkyl styrene is diluted with a substantial quantity of carbon disulfide. The quantity of carbon disulfide employed as a diluent may vary from about 1 to 15 volumes per volume of alpha alkyl styrene or of polymerizable mixtures containing an alpha alkyl styrene, depending principally upon the temperature and degree of polymerization desired. For example, satisfactory polymerization of alpha methyl styrene at —50° C. in the presence of AlCl₃ was obtained when the alpha methyl styrene was diluted with an equal volume of carbon disulfide. On the other hand, at much lower temperatures a much greater dilution must be maintained, for example, alpha methyl styrene diluted with 14 volumes of carbon disulfide was successfully polymerized with a TiCl₄ catalyst at —95° C. to yield a relatively high molecular weight resin. Since carbon disulfide freezes at approximately —112° C., the use of such diluent, per se, imposes a restriction with respect to the temperature at which polymerization may be effected. In the event that it is desired to carry out the polymerization at temperatures below the freezing point of carbon disulfide, we have found that the carbon disulfide may be replaced, in part, with a diluent having a lower freezing point or which is capable of lowering the freezing point of carbon disulfide to a substantial extent without deleteriously affecting the polymerization reaction. For example, the carbon disulfide may be replaced in part by an alkyl halide such as ethyl chloride or bromide, propyl chloride, all of which have freezing points lower than that of carbon disulfide. Since the molecular weight of the polymers produced in the presence of a carbon disulfide diluent increases very rapidly at low temperatures, i. e., —100° C. or lower, the beneficial effect of a further lowering of the reaction temperature by the addition of an alkyl halide diluent more than offsets the deleterious effect that the presence of the alkyl halide may have upon the polymerization reaction. It is therefore possible to add substantial quantities of alkyl halide or other diluent to the carbon disulfide to effect a lowering of the freezing point thereof without seriously interfering with the polymerization of the alpha alkyl styrene to high molecular weight resins.

The present process is applicable to the homopolymerization of any alpha alkyl styrene or to the copolymerization of any two or more alpha alkyl styrenes. As herein used, the term "alpha alkyl styrene" includes any styrene represented by the formula:

wherein X may be an alkyl group such as methyl, ethyl, propyl, isopropyl, butyl, amyl, hexyl, etc., but is preferably methyl, and wherein Y may be hydrogen or alkyl.

The process of the present invention is particularly applicable to the production of polymers or copolymers of very high molecular weight, which necessitates the employment of low temperatures, preferably between —50° C. and —150° C., the lower the temperature, the higher the molecular weight attained.

In operating with active Friedel-Crafts type catalysts, it has been found advantageous to first dissolve or disperse the catalyst in a suitable solvent, preferably carbon disulfide or a mixture containing substantial amounts of carbon disulfide, before bringing it into contact with the alpha alkyl styrene or styrenes to be polymerized. The catalyst solution is most suitably applied in the form of droplets or as a mist or dispersion. Any suitable spraying or atomizing device having jets or orifices of proper restriction may be employed to produce the spray or mist, which may be injected on or under the surface of the reactant mixture. As pointed out hereinbefore, the catalyst solvent, i. e., carbon disulfide, may be replaced in part or in toto with other solvents, provided the alpha alkyl styrene to be polymerized is well diluted with carbon disulfide. In general, any alkyl halide of suitable freezing point and solvent power may be used, although chlorides are preferred over the corresponding bromides, iodides, and fluorides. Various Friedel-Crafts type catalysts may be satisfactorily employed, including $AlCl_3$, $AlBr_3$, $ZnCl_2$, $TiCl_4$, $SnCl_4$, and $BF_3$, preference being had for $TiCl_4$ since it is more soluble in the various solvents, and particularly carbon disulfide, than the other catalysts mentioned.

In the practice of the invention, a solution of the catalyst in the solvent is first made up at ordinary room temperature, carbon disulfide being the preferred solvent. The concentration of the catalyst in the solution may vary between relatively wide limits, concentrations between 0.25% and 1% being satisfactory, although higher concentrations may be utilized, i. e., up to about 5%. The catalyst solution is then cooled by appropriate means such as by the use of carbon dioxide or liquefied normally gaseous hydrocarbons, for example, ethane, ethylene, or propane to approximately the temperature at which it is desired to carry out the polymerization. The refrigerant used in the cooling of the solution may be applied either externally or internally, but best results have been obtained using the refrigerant externally. Following the cooling operation, the solution in the form of a spray or mist produced by a suitable atomizing device is brought into contact with the alpha alkyl styrene or styrenes to be polymerized, said styrene or styrenes being diluted with a suitable quantity of carbon disulfide. It has also been found desirable to pre-cool the styrene or styrenes, after dilution, to substantially the temperature at which it is desired to effect the polymerization, which temperature may be maintained by any appropriate means, for example, indirect heating exchange with solid carbon dioxide, liquefied nitrogen, or liquefied normally gaseous hydrocarbons. During the polymerization, the reaction mixture is usually kept under constant agitation not only as an aid to temperature control but also to prevent discoloration of the polymer. At temperatures of the order of —50° C. to —100° C., the polymer generally forms a gelatinous slurry which may be removed from the reaction mixture by any appropriate means, for example, by decantation or filtration. The complex formed between the catalyst (particularly $AlCl_3$) and the polymer may be decomposed either prior to filtration or subsequently by the addition of agents such as water, or alcohol, or ammonia. The polymers may be purified by washing thoroughly with a low boiling petroleum naphtha or similar agent prior to drying.

The present invention may be further illustrated by the following examples, which, however, are not to be taken as limiting the scope thereof.

1. 210 volumes of alpha methyl styrene was diluted with 210 volumes of carbon disulfide, and the solution was cooled to —50° C. by the direct addition of solid carbon dioxide. 100 volumes of a 1% solution of aluminum chloride in carbon disulfide, pre-cooled to —50° C., was injected into the well stirred alpha methyl styrene solution over a period of 10 minutes. Upon completion of the polymerization reaction, the viscous solution was treated with 200 volumes of 95% ethyl alcohol which completely precipitated the polymer and in addition, destroyed any remaining catalytic activity. The polymer product was then steam distilled yielding a white granular mass which was readily molded to yield a clear, solid plastic mass. The molecular weight of this polymer was 28,000, as compared to 15,000 for a polymer produced under the same conditions, with the exception that ethyl chloride was substituted for carbon disulfide both as a diluent for the alpha methyl styrene and as a solvent for the aluminum chloride.

2. 210 volumes of alpha methyl styrene was diluted with 2940 volumes of carbon disulfide, and the solution was cooled with liquid nitrogen to —95° C. 100 volumes of a 1% solution of titanium tetrachloride in carbon disulfide, pre-cooled to —75° C., was injected into the well stirred alpha methyl styrene solution over a period of 10 minutes. A gelatinous white mass separated from the solution shortly after the addition of the catalyst was initiated. Complete precipitation of the polymer and destruction of the remaining catalyst was accomplished by the addition of 200 volumes of 95% ethyl alcohol. Carbon disulfide and unreacted monomeric alpha methyl styrene was readily removed from the polymer product by steam distillation to yield a white granular mass which was readily molded to a clear, tough plastic mass. The molecular weight of this polymer was 72,300, as compared with 45,000 for a polymer prepared under similar conditions, with the exception that ethyl chloride was substituted for carbon disulfide both as a diluent for the alpha methyl styrene and as the solvent for the catalyst.

While it is preferred to employ the spray technique in bringing the solution of the catalyst into contact with the diluted alpha alkyl styrene, especially where a high molecular weight polymer is desired, any other suitable method of contacting the reactant mixture with the catalyst solution may be employed. For example, the process may be executed by simply pouring the catalyst solution into the reactant mixture, the mixture preferably being vigorously agitated. Furthermore, while it is preferred to employ the catalyst in solution, the polymerization reaction may also be effected with the catalyst in the solid or gaseous state, for example, solid finely divided aluminum chloride, or gaseous boron fluoride.

While the present invention has been described particularly with reference to the polymerization of alpha methyl styrene, such invention is equally well adapted in the polymerization of other alpha alkyl styrenes, such as alpha methyl para methyl styrene, alpha methyl para ethyl styrene, alpha methyl para isopropyl styrene, alpha methyl para propyl styrene, alpha methyl meta methyl styrene, alpha ethyl styrene, and the like.

We claim:

1. A process for homo-polymerizing an alpha alkyl styrene hydrocarbon in which the alkyl group contains not more than 6 carbon atoms, which comprises contacting said alpha alkyl styrene with an active Friedel-Crafts catalyst in the presence of a solvent comprising carbon disulfide at a temperature between 10° C. and −100° C., the ratio of carbon disulfide to alpha alkyl styrene being between 1 and 15 to 1.

2. A process for homo-polymerizing an alpha alkyl styrene hydrocarbon in which the alkyl group contains not more than 6 carbon atoms, which comprises contacting a carbon disulfide solution of said alpha alkyl styrene with a carbon disulfide solution of an active Friedel-Crafts catalyst in a concentration between 0.25% and 5% at a temperature between 10° C. and −100° C., the ratio of carbon disulfide to alpha alkyl styrene being between 1 and 15 to 1.

3. A process for homo-polymerizing alpha methyl styrene, which comprises contacting said alpha methyl styrene with an active Friedel-Crafts catalyst in the presence of a solvent comprising carbon disulfide at a temperature between 10° C. and −100° C., the ratio of carbon disulfide to alpha methyl styrene being between 1 and 15 to 1.

4. A process for homo-polymerizing alpha methyl styrene, which comprises contacting said alpha methyl styrene with an active Friedel-Crafts catalyst in the presence of a liquid solvent comprising carbon disulfide at a temperature below 10° C., the ratio of carbon disulfide to alpha methyl styrene being between 1 and 15 to 1.

5. A process for homo-polymerizing an alpha alkyl styrene hydrocarbon in which the alkyl group contains not more than 6 carbon atoms, which comprises contacting said alpha alkyl styrene with $AlCl_3$ in the presence of a solvent comprising carbon disulfide at a temperature between 10° C. and −100° C., the ratio of carbon disulfide to alpha alkyl styrene being between 1 and 15 to 1.

6. A process for homo-polymerizing an alpha alkyl styrene hydrocarbon in which the alkyl group contains not more than 6 carbon atoms, which comprises contacting said alpha alkyl styrene with $TiCl_4$ in the presence of a solvent comprising carbon disulfide at a temperature between 10° C. and −100° C., the ratio of carbon disulfide to alpha alkyl styrene being between 1 and 15 to 1.

ARTHUR B. HERSBERGER.
RANDALL G. HEILIGMANN.

REFERENCES CITED

The following references are of record in the file of this patent:

UNITED STATES PATENTS

| Number | Name | Date |
|---|---|---|
| 2,276,893 | Thomas | Mar. 17, 1942 |
| 2,300,069 | Skooglund | Oct. 27, 1942 |
| 2,368,538 | Gleason | Jan. 30, 1945 |
| 2,412,921 | Sparks et al. | Dec. 27, 1946 |
| 2,436,614 | Sparks et al. | Feb. 24, 1948 |

OTHER REFERENCES

Standinger Berichte, vol. 62 (1929), pp. 442–456.